No. 776,926. Patented December 6, 1904.

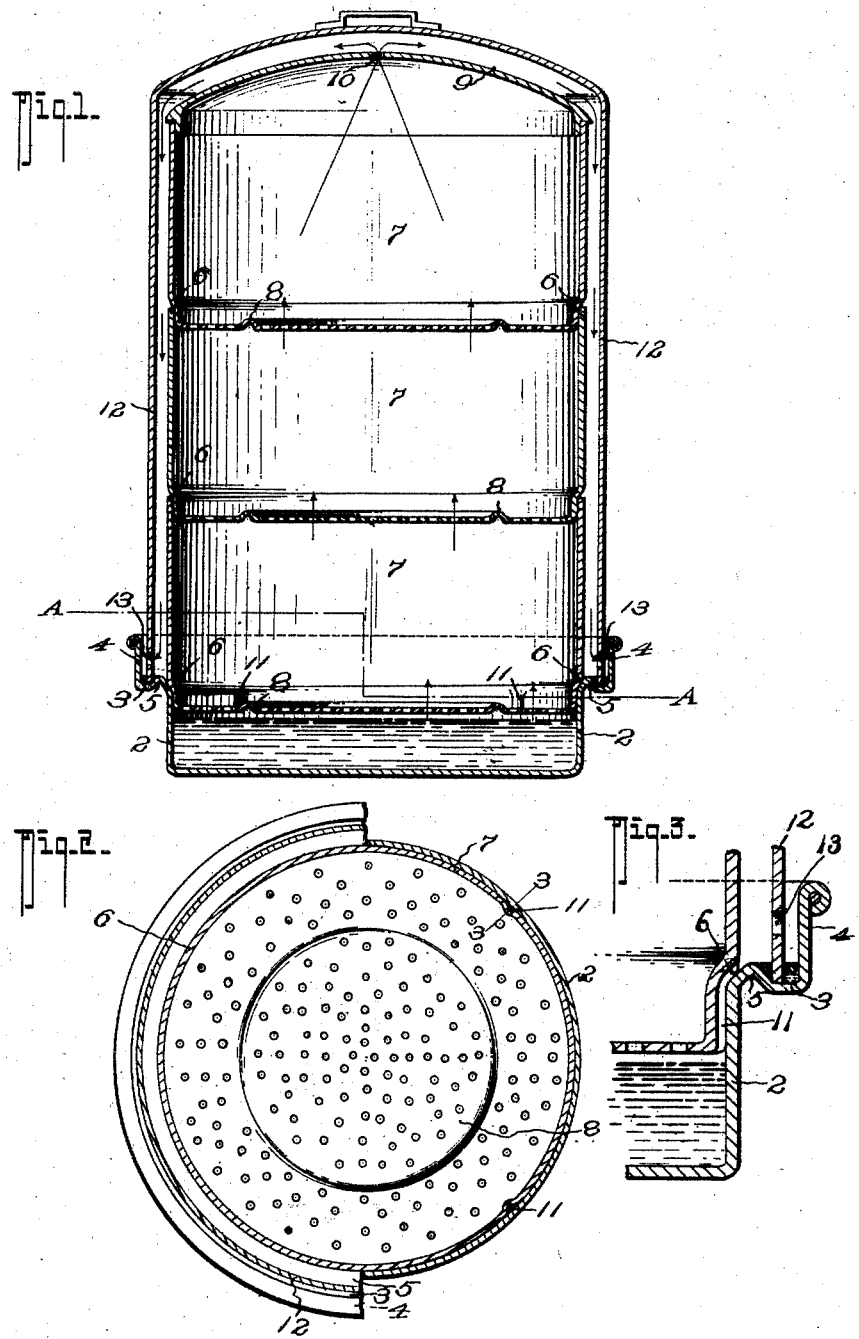

UNITED STATES PATENT OFFICE.

MATHEW W. MISENER, OF VANCOUVER, CANADA.

STEAM COOKING DEVICE.

SPECIFICATION forming part of Letters Patent No. 776,926, dated December 6, 1904.

Application filed April 27, 1904. Serial No. 205,221. (No model.)

*To all whom it may concern:*

Be it known that I, MATHEW W. MISENER, a citizen of the United States of America, residing at the city of Vancouver, in the Province of British Columbia, Canada, have invented a new and useful Improvement in Steam Cooking Devices, of which the following is a specification.

My invention relates to an improved steam-cooker designed to permit the escape of the vapor rising from and through the cooking-trays and to insure a more uniform distribution of the heat around them by inducing a circulation of the steam by which the cooking is effected. With these improvements the cooked material is not water-sodden and the cooking is effected with a maximum economy of heat. The means by which I attain these advantages is fully described in the following specification, reference being made to the drawings which accompany it, in which—

Figure 1 is a vertical section through the cooker complete, and Fig. 2 a sectional plan on the line A A in Fig. 1. Fig. 3 is a detail sectional view, on an enlarged scale, of a portion of the cooker.

The base of the cooker consists of a shallow circular pan 2, which may be either placed on the plate of a stove or suitably supported over a lamp or gas-flame. The upper portion of this pan is outwardly flanged horizontally, as at 3, and the edge is thereafter upwardly turned and forms an annular rim 4. Toward the inner diameter of the horizontally-flanged portion 3 an annular ridge 5 upwardly projects above the plane of 3, so as to form an annular groove toward the outer diameter adapted to retain a lodgment of water.

Socketed into the inner diameter of the water-pan and resting on the upper edge thereof on a slight shoulder 6 is the lower one of a series of cooking vessels 7 7 7, and each of the upper ones is similarly socketed against a shoulder 6 into the one beneath. The bottom of each of these cooking vessels is perforated to permit the free passage of steam or vapor through them, and each is also provided with an upwardly-projecting ridge or ridges 8, which will sustain the pan or dish in which the food is placed sufficiently clear of the bottom of the cooking vessel that the perforations will not be closed. Socketed into the top cooking vessel of the series is a slightly-domed cover 9, having toward its center an aperture 10, which will permit the escape of the vapor and steam of cooking from within the vessels. In the socket-seat of the lower cooking vessel within the water vessel 2 vertical grooves or flutes 11 are formed either in the body of the water vessel or in the reduced diameter of the cooking vessel, which flutes are designed to permit the water of condensation to drain back from the jacket-space to the water vessel.

Entirely inclosing the series of cooking vessels 7 is an outer cover 12, the lower edge of which rests on the horizontal portion 3 of the water vessel 2 in the ring-space between the annular ridge 5 and the upwardly-turned rim 4. The lower edge of the cover will thus be sealed by the water lodgment between ridge and rim to prevent any escape of vapor, thereby causing it to be distributed around the cooking vessels before escaping through the openings 13, while a sufficient space will be retained between the cooking vessels and the cover to permit of the circulation of steam around the vessels.

Toward the lower edge of the outer cover 12 and below the level of the upper edge of the rim 4 a series of small apertures 13 is provided, the object of which will be explained.

The cooking vessels and the cover may all be provided with light handles or finger engagements to enable them to be lifted when required, but such are not material to this application.

The foregoing describes the construction of the several parts of the apparatus, the object of which construction will now be explained.

As the water in the vessel commences to boil the steam will rise freely from its surface, and passing through the perforations in the bottom of each cooking vessel will be brought intimately into contact with the food therein, and passing upward will, together with the vapor of cooking, pass through the aperture 10 in the domed cover 9 of the top vessel, as indicated by the arrow. The apertures 13 toward the lower edge of the outer cover 12 in the first instance serve to permit the air to escape as it is driven out by the steam, and then after the air has passed out through the said apertures steam will pass out of said apertures, and by arranging the parts as shown a circulation of steam is maintained up the inside of the vessel 7 and down the outside thereof between them and the cover 12, exhausting through the apertures 13. (See arrows, Fig. 1.)

The provision of the central aperture 10 in the cover 9 and the apertures 13 toward the lower edge of the outer cover 12 are the essential features of my invention, as on them depends, first, the free removal of the steam and vapor of cooking from the vessels 7 which contain the food, and, secondly, the free circulation of the escaping steam downward, so that it may surround the cooking vessels and maintain an equable heat therein.

The water of condensation will flow down the inside of the outer cover 12, and while maintaining the water seal in which the lower edge of the cover 12 rests will overflow the ridge 5 and return to the water vessel 2 through the grooves 8. The slight escape of steam and vapor from the apertures 13 will be baffled by and will condense on the rim 4, the water therefrom returning to the water vessel.

The lower edge of the upper casing 12 is sealed by a water seal, and the apertures 13 are provided so that the circulation of the steam may be uniform around the cooking vessels. If the lower edge of the casing were depended on to provide means for the escape of steam and its seat was unequal on the ledge of the water-pan, the flow of steam would be directed to the space or spaces which might be on one side alone, or, again, if the seat were fairly even the pressure would likely accumulate until it became sufficient to lift and tip the casing, thereby making an irregular circulation. I have therefore found it advantageous to seal the lower edge of the casing 12 with the water seal, as before explained, and provide for a free escape of the steam by means of the apertures 13 of such number and size as the conditions may require.

It should be understood that the steam-pressure within the cooker is extremely light, and it will therefore be apparent that the steam generated from the water in the water vessel will rise freely through the perforations in the bottom of the cooking vessels 7, which are directly over the surface from which it escapes, rather than through the extremely-limited area of the flutes or grooves 11, exit through which will be baffled or prevented by the water of condensation which flows over the edge of the sealing-grooves. Any steam which may seek to escape through the flutes 11 will be met with and condensed by the water flowing into the vessel 2 through the said grooves 11 from the water seal 3.

I am aware that prior to my invention cooking vessels have been nested in a similar manner over a water vessel and have been inclosed by an outer casing resting in a water seal; but I believe myself to be original in the provision of the means described for the escape of air and for inducing the circulation of the steam downward in the jacket-space; and I therefore claim as new and desire to be protected in by Letters Patent—

1. In a steam cooking device, a shallow water vessel having an annular groove outwardly flanged from the upper edge of the water vessel, a plurality of cooking vessels seated over said shallow water vessel, the lower one of said cooking vessels being seated within said water vessel, and having a series of vertical grooves in the lower seat portion of the said lower cooking vessel to permit the water of condensation to return to the water vessel, and a hood inclosing said cooking vessels and resting in the annular groove of the water vessel substantially as shown and for the purposes described.

2. In a steam cooking device, a plurality of cooking vessels socketed together, a shallow water vessel, the lower cooking vessel being socketed into said shallow water vessel, said water vessel having an outwardly-projecting groove, a domed cover for said cooking vessels, said cover having apertures in the central portion of its top, a cylindrical cover for inclosing the cooking vessels having apertures near its lower edge, said lower cooking vessel having a plurality of vertically-disposed grooves in its outer surface near the bottom thereof, said grooves communicating with the space between the cooking vessels and the cylindrical cover and with the interior of the water vessel substantially as shown and for the purposes described.

3. In a steam cooking device, a series of cooking vessels each of said vessels having its bottom portion socketed into the top portion of the adjacent cooking vessel, the upper cooking vessel being provided with an apertured top, each of said cooking vessels having an apertured bottom, each of said vessels being cylindrical in form and of the same diameter, a water vessel consisting of a body portion for containing water, the lower cooking vessel being socketed near its lower portion in the water vessel, said water vessel having an annular pocket, a cylindrical cover adapted to seat in said water-vessel pocket and to inclose said cooking vessels, said cover having a plurality of apertures near the lower edge substantially as shown and for the purposes described.

4. In a steam cooking device, a series of cooking vessels, each of said vessels having its bottom portion socketed into the top portion of the adjacent cooking vessel, the upper cooking vessel being provided with an apertured top, each of said cooking vessels having an apertured bottom, each of said vessels being cylindrical in form and of the same diameter, a water vessel consisting of a body portion for containing water, the lower cooking vessel being socketed near its lower portion in the water vessel, said water vessel having an annular pocket, a cylindrical cover adapted to seat in said water-vessel pocket and to inclose said cooking vessels, said cover having a plurality of apertures near its lower edge, and means for permitting the water of condensation overflowing from the pocket of the water vessel to return to the water-chamber of the water vessel substantially as shown and described.

5. In a steam cooker, a plurality of cooking vessels having perforated bottoms, said vessels being socketed together, a shallow water vessel, the lower cooking vessel being socketed into said shallow water vessel, said water vessel having an annular outwardly-projecting water-receiving groove, an outer casing inclosing the cooking vessels and having its lower edge seated in said cover-groove to form a water seal, a domed cover to the top cooking vessel having a perforation toward its center, said outer casing having a plurality of perforations toward its lower edge above the water seal, a baffle opposite each aperture and means for returning the water of condensation from the water seal to the water-receiving chamber of the water vessel.

6. A cooker of the character stated, comprising a water vessel including a water-receiving chamber 2, said water vessel being provided with an annular outwardly-extending grooved portion 3 forming a water-receiving trough, said water vessel being also provided with an annular upwardly-extending baffle member 4, a plurality of vessels each comprising a cylindrical body having its lower portion of less diameter than its upper portion to seat in the upper portion of the next succeeding vessel, said cooking vessels having perforated bottoms and provided each with a circular bead in its bottom, a domed top for the upper cooking vessel having a centrally-disposed aperture, said lower cooking vessel seating in the upper portion of the water-receiving chamber of the water vessel with its bottom arranged above the water-level, said lower cooking vessel where its walls engage with the walls of the water vessel being provided with a plurality of vertically-extending grooves 11 to form a water-passage for the overflow water in the groove 3 to the water-receiving chamber of the water vessel, a cylindrical cover inclosing said cooking vessels and of greater diameter than said cooking vessels and said cover seating with its lower edge in the water-seal groove 3 and being provided at such lower edge with a plurality of escape-apertures substantially as shown and for the purposes described.

In testimony whereof I have signed my name to this specification in the presence of two subscribing witnesses.

MATHEW W. MISENER.

Witnesses:
  ROWLAND BRITTAIN,
  ELLICE WEBBER.